UNITED STATES PATENT OFFICE.

MOODIE R. FREEMAN, OF DETROIT, MICHIGAN, ASSIGNOR OF ONE-HALF HIS RIGHT TO ARTHUR F. MANSUR, OF SAME PLACE.

IMPROVEMENT IN PHOTO-MECHANICAL PRINTING.

Specification forming part of Letters Patent No. 209,036, dated October 15, 1878; application filed June 8, 1878.

*To all whom it may concern:*

Be it known that I, MOODIE R. FREEMAN, of Detroit, in the county of Wayne and State of Michigan, have invented a new and valuable Improvement in Process of Photo-Mechanical Printing; and I do hereby declare that the following is a full, clear, and exact description of the same.

The nature of my invention relates to a process of photo-mechanical printing, as will be fully hereinafter set forth.

In carrying out my invention I take two pieces of suitable plate-glass, and, placing emery-flour and water between them, I rub them together with a circular motion until the inner surface of each plate presents a finely-ground appearance, when they are placed under the tap and thoroughly washed to eliminate all the emery, and afterward dried. I then take the whites of two eggs and beat them well with one-half ounce of skimmed milk, and add slowly while beating a solution of four and a half grains of chrome-alum dissolved in two ounces of water, and filter the whole through a dampened woolen cloth into a clean graduate-glass. I then flow the surface of the glass plates with this solution, and dry by heat, care being taken to avoid dust and light coming in contact. The glass plate thus prepared is the one upon which the finished impression remains, and from which the mechanical prints are made.

To a suitable frame I secure a plate-glass with a polished surface, and flow this surface with a solution of one ounce of pure ox-gall dissolved in eight ounces of water, drain it, and then dry it thoroughly. I then make a solution of two ounces of gelatine dissolved in water, four ounces of nitric ether, and twenty drops of glycerine, which solution is properly filtered and afterward poured upon the base-plate in the frame. I then take the ground glass, prepared, as described, with albumen, and place it upon the solution upon the frame-base, being careful to hold it up by means of card-board pasted along the sides or corners, or by other proper means. The frame is then placed in a cool place until the solution between the plates has become firm, when the frame is removed and the glass plates forced apart. The different solutions stick to the ground plate, and present a finely-polished appearance upon the surface, which, separated from the polished base-plate, is allowed to dry in a place free from dust. It is then immersed, face upward, in a solution made by dissolving three hundred and twenty grains of chrome-alum in sixteen ounces of water for thirty seconds, more or less, after which it is immersed in a saturated solution of bichromate of potassa and water, drained well, and allowed to dry in the dark.

When dry a photographic negative is placed, by means of a photographic printing-frame, in contact with the sensitive surface of the prepared plate, and it is placed in sunlight from five to thirty minutes, according to intensity of negative, after which it is taken into a dark room and immersed in acetic acid No. 8 for fifteen minutes, and washed under a tap until the high lights are free from bichromate of potassa, or until a clear appearance is observed by looking through them.

The plate is now prepared for printing, which is done as follows: After the surface is blotted with a porous paper, a rubber roller, with lithographic or fatty ink evenly diffused on its surface, is passed over the plate until the ink is properly distributed thereon, and the plate is ready for printing upon paper in any ordinary or usual roller-press, the balance of the process being obvious to any one skilled in the art.

I claim—

The process of preparing a photo-mechanical printing-plate, which consists in flowing a ground glass plate with a solution of albumen, milk, and chrome-alum, and a polished glass plate with ox-gall and a solution of gelatine, nitric ether, and glycerine, then placing the two plates together, and, after drying, forcing apart and treating the made surface on the ground glass plate to the sensitive solutions, substantially in the manner and for the purposes set forth.

In testimony that I claim the above I have hereunto subscribed my name in the presence of two witnesses.

MOODIE R. FREEMAN.

Witnesses:
ARTHUR F. MANSUR,
JOHN B. CORLISS.